April 6, 1954 J. H. HALL 2,674,712
ELECTRICAL BATTERY CHARGING APPARATUS
Original Filed Aug. 30, 1950 2 Sheets-Sheet 1
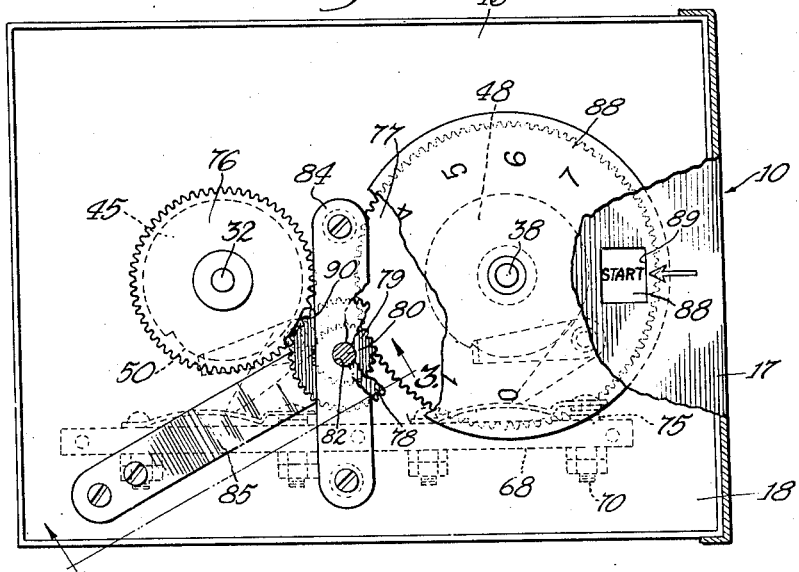
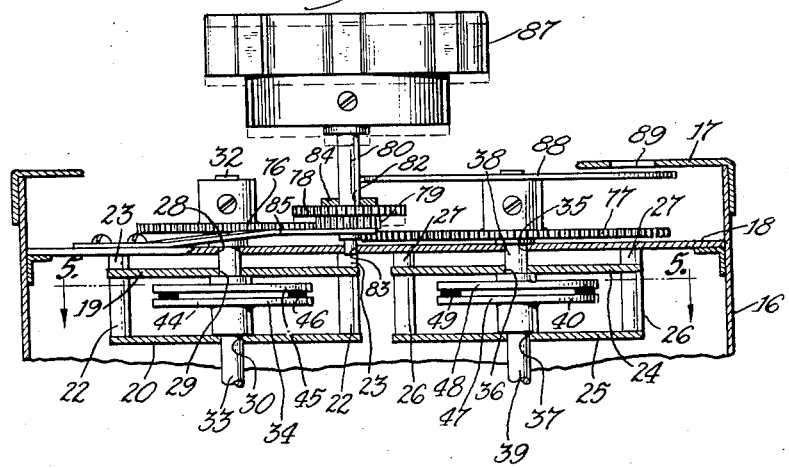
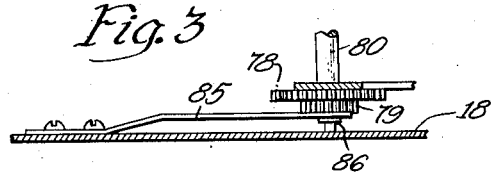
Inventor
James H. Hall
by Schneider & Dressler
Attorneys April 6, 1954 J. H. HALL 2,674,712
ELECTRICAL BATTERY CHARGING APPARATUS
Original Filed Aug. 30, 1950 2 Sheets—Sheet 2

Inventor
James H. Hall
by Schneider + Dressler
Attorneys

Patented Apr. 6, 1954

2,674,712

UNITED STATES PATENT OFFICE 2,674,712

ELECTRICAL BATTERY CHARGING APPARATUS

James H. Hall, Lake Bluff, Ill., assignor to Fansteel Metallurgical Corporation, North Chicago, Ill., a corporation of New York Original application August 30, 1950, Serial No. 182,346, now Patent No. 2,635,689, dated April 21, 1953. Divided and this application December 22, 1952, Serial No. 327,307

21 Claims. (Cl. 320—23)

The present invention relates to a time-controlled battery charging system and to an electrical timing device for use in such a system.

This application is a division of application Serial No. 182,346 filed August 30, 1950.

The battery charging system of the present invention is especially useful in the charging of lead-type storage batteries wherein it is desirable to initially charge the lead storage battery at a relatively high rate until a predetermined battery voltage is reached, after which a reduced charging rate is desirable in order to prevent excessive gassing and consequent injury to the battery. The necessity for having a reduced charging rate for lead storage batteries near the end of the charging period is well known in the art.

There are numerous occasions when the frequent use of a battery charger makes it especially desirable that the charging equipment be automatically operative so that little attention need be given the equipment once it is initially placed in operation. Such automatic equipment should include features which will eliminate the chance of damaging the batteries being charged due to an excessive charging time or rate.

In accordance with the present invention, it has been found that to prevent damage to a storage battery system being charged, it is necessary to limit the maximum charging time for a given storage battery system independently of the time required for the reduced charging rate. That is to say, in a battery charging operation, when the battery has reached a state of charge requiring a reduced charging rate, it may be undesirable to continue the period of reduced charging rate if the battery being charged has been receiving a charge for a certain over-all length of time.

The present invention limits the maximum possible charge time of a battery to a preselected period of time. If the battery approaches its fully charged condition in a time less than the maximum, the charging rate is reduced until the maximum over-all preselected time period is past. If the battery does not approach the degree of charge necessary to initiate a reduced charging rate, the battery charging system of the present invention still terminates the charging operation if the maximum preselected over-all charging period has elapsed. Thus, an operator may set the battery charging apparatus of the present invention to the desired maximum charging period, then leave the battery charging apparatus without worry that the battery may be damaged due to an excess charging period.

The present invention attains this desired end by providing a battery charging apparatus which includes two pairs of electrical switch contacts connected between the source of electrical energy for charging the battery and the input to the storage battery terminals. The period of time during which the two pairs of series-connected switch contacts are closed is determined by respective time-control devices associated with each of the pairs of contacts. One of the time-control devices is adapted to be preselectively set to close its associated switch contacts for a period of time which is the maximum permissible charge period desired. The other time-control device is adapted to open its associated switch contacts after a definite period of time has elapsed, which period of time begins when the battery has been charged to a degree which requires a reduced charging rate. In this manner, the flow of electrical energy to the battery being charged will be interrupted when either one of the switch contacts is opened by its associated time-control device, which event occurs either when the maximum permissible safe charging period has expired or when the reduced charging rate has occurred for a fixed predetermined period, whichever event occurs first. This insures the safe charging of a storage battery system and makes it unnecessary for an operator to be on hand to watch the progress of the charging operation.

In accordance with a further feature of the present invention, a single manual control is provided which simultaneously adjusts the time-control devices to the proper time of operation, thereby greatly simplifying the manipulations necessary to adjust the battery charging system of the present invention.

A further description of the features of the present invention which make the above advantages possible will be described in detail in the following specification, taken in conjunction with the accompanying drawings in which:

Figure 1 is a top plan view of a preferred embodiment of my timing apparatus, wherein parts are cut away to show details of the illustrated structure;

Figure 2 is a fragmentary side view with certain parts shown in section to illustrate the timing apparatus;

Figure 3 is a fragmentary side sectional view taken substantially on a line 3—3 of Figure 1 and in the direction indicated by arrows;

Figure 4:
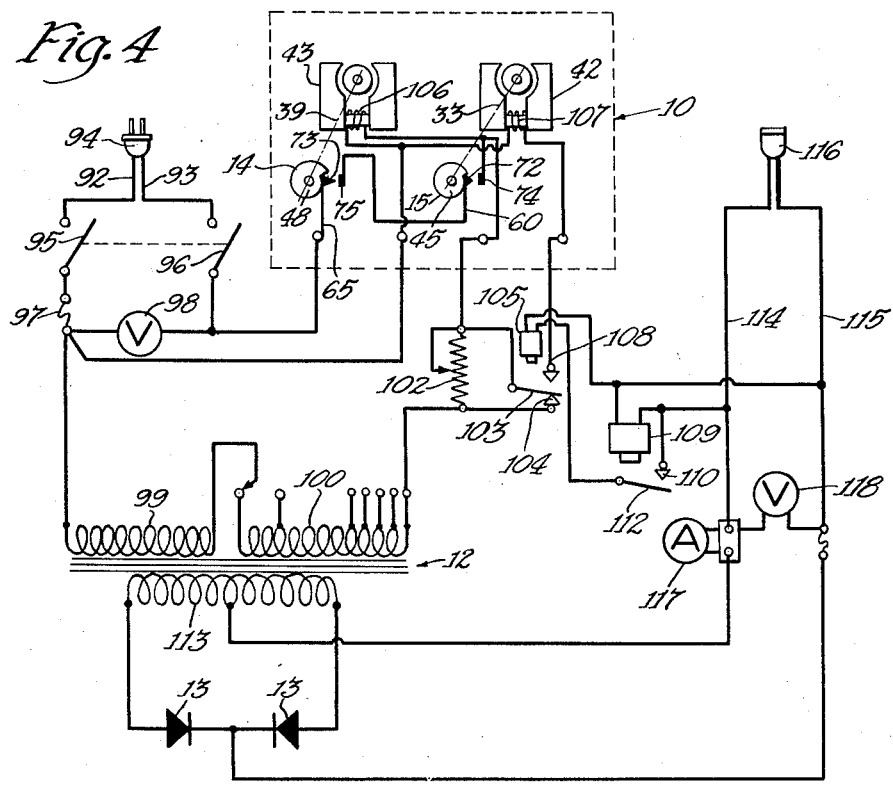
Figure 4 is a schematic circuit diagram of electrical apparatus adapted to the charging of storage batteries and embodying the timing apparatus depicted in Figure 1.

Considered generally, the exemplary embodiment of my invention, which is illustrated herein for illustrative purposes, includes timing apparatus 10 which controls periods of operation of electrical apparatus, such as a battery charging system which is depicted schematically in Figure 4. In the disclosed system and apparatus, the timing apparatus 10 is connected in series with the input circuit to a battery charging transformer 12 and associated rectifier elements 13 for supplying direct current to output leads for battery charging and like purposes. The time device 10, in the present instance, includes two timing switches 14 and 15, one of which determines a selected maximum operating time for the system, while the other determines a preselected shorter time period and is utilized for determining the period of the finish charge after the battery voltage reaches a predetermined value.

Referring in greater detail to the structure of my disclosed timing apparatus 10, which is illustrated in Figures 1, 2, 3, 5 and 6, and shown diagrammatically in Figure 4, this apparatus includes a housing 16 made of sheet metal and having a cover 17 and a mounting panel 18 which is supported internally of the housing in spaced relationship to the cover. At one end of the housing, mounting plates 19 and 20 are supported in spaced relationship to one another and in spaced relationship to the panel 18 by posts 22 and spacing collars 23. At the other end of the housing, similar mounting plates 24 and 25 are supported below the panel 18 in spaced relationship to the panel and in spaced relationship to one another by posts 26 and spacing collars 27.

The panel 18 and the mounting plates 19 and 20 have aligned bearing bores 28, 29 and 30 therein which support shafts 32 and 33 in axially aligned relationship, the shafts 32 and 33 being drivingly connected by a friction clutch 34 located between the mounting plates 19 and 20. Similarly, aligned bearing bores 35, 36 and 37 in the panel 18 and the mounting plates 24 and 25 respectively support shafts 38 and 39 in axially aligned relationship, the latter shafts being drivingly connected by a friction clutch 40 located between the mounting plates 24 and 25.

As diagrammatically depicted in Figure 4, the shafts 33 and 39 are drivingly connected by motors 42 and 43, which motors are preferably of the self-starting synchronous type and may have the same or different operating speeds, depending upon the range of operating periods desired. By way of example, the timing period for the motor 42 in the present instance is approximately three hours, while the motor 43 may time a period up to nine hours. Although not illustrated in detail herein, the motors 42 and 43 are usually connected to the respective shafts 33 and 39 through gearing such that the maximum period which is to be timed by either motor produces somewhat less than one revolution of each of the shafts 33 and 39 during the timed interval.

In my disclosed structure, the clutch 34 includes a driving plate 44 and a driven plate 45 which are drivingly connected by an intervening ring 46 of friction material. Likewise, the clutch 40 has a driving plate 47 and a driven plate 48 drivingly connected by an intervening ring 49 of friction material. In addition to serving as clutch plates, the driven plates 45 and 48 serve as switch actuating cams having peripheral cam surfaces 50 and 52, respectively.

Figure 5:
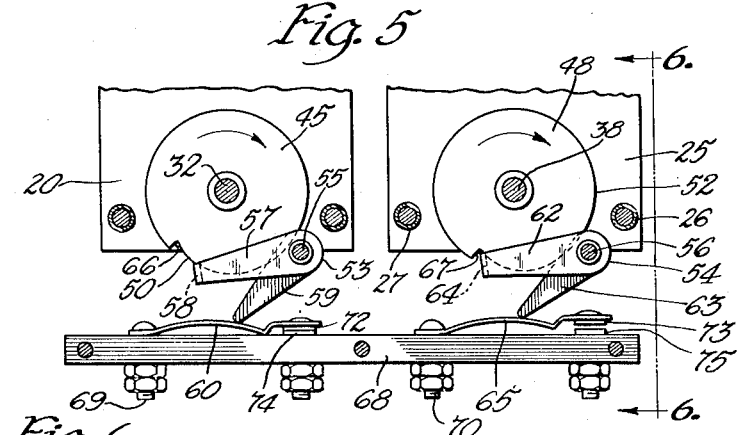
Figure 5 is a fragmentary top sectional view taken substantially on a line 5—5 of Figure 2 and in the direction indicated by arrows.
Figure 6:
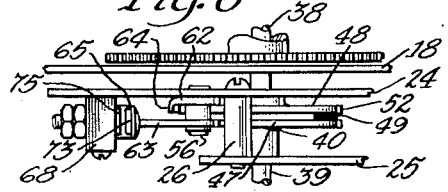
Figure 6 is a fragmentary end view in elevation, taken substantially as indicated by a line 6—6 in Figure 5 and accompanying arrows.

As shown in Figures 5 and 6, bell crank levers 53 and 54 are supported for rotational movement on mounting posts 55 and 56. The bell crank lever 53 has an arm 57, at the extending end of which is a cam engaging end portion 58 aligned for engagement with the cam surface 50. Another arm 59 of the bell crank lever 53 engages a resilient switch arm 60, which switch arm normally biases the bell crank lever in a direction such that it holds the cam engaging end portion 58 of the arm 57 in contact with the cam surface 50.

The bell crank lever 54 is similarly constructed and arranged, and has arms 62 and 63, the former of which has a cam engaging end portion 64 aligned for engagement with the cam surface 52, and the latter of which engages a resilient switch arm 65.

The cam surfaces 50 and 52 include notches 66 and 67, one end of each of which is terminated by an abrupt shoulder, and the other end of which curves gradually into the substantially circular cam surface, whereby rotational movement of each of the cams from a selected position and in the direction indicated by arrows in Figure 5 holds the switch contacts closed until the cam engaging end portion of the bell crank drops into the notch to effect an abrupt break.

As also shown in Figures 5 and 6, a strip of insulating material 68 is mounted within the housing and secured to extending portions of the mounting plates 19 and 24. This strip of insulating material serves as an insulating support for switches which include the resilient switch arms 60 and 65, these switch arms each being secured at one end of the insulating strip by fastening means, such as screws 69 and 70. At the opposite ends of the resilient arms 60 and 65, contacts 72 and 73 are secured thereto in alignment for engagement with stationary contacts 74 and 75, which latter contacts are also secured to the insulating strip 68.

From the foregoing description, it may be readily understood that the respective cams are driven by the motors 42 and 43 at predetermined rates. With the disclosed structure, the switch contacts associated with each of the cams are held closed during the major portion of one revolution of each of the cams. At the end of a timed period, the cam engaging portions of the bell crank arms drop into the cam notches to open the respective contacts. The rate for each cam being predetermined, the timing of selected intervals less than that required for one revolution of each of the cams can be timed by selecting the starting position of each cam. In order that the positions of the cams may be readily adjusted without turning the motors and any intervening drive mechanism, the friction clutches 34 and 40 have been provided. Additionally, and to adapt the disclosed timing apparatus to use in the disclosed system, I have provided a mechanism for setting the cams to their starting positions.

As depicted in Figures 1 and 2, gears 76 and 77 are secured to the shafts 32 and 38, respectively, upon which shafts the combination cam and clutch plates 45 and 48 are drivingly mounted. The gears 76 and 77 are carried between the panel 18 and cover 17 within the housing and are in different planes, so as to be adapted to engagement by pinions 78 and 79 mounted in adjacent and concentric relationship on a shaft 80. The shaft 80 extends through the cover 17 and is supported for rotation in bearing bores 82 and 83 in a supporting strip 84 and in the panel 18, the supporting strip 84 being secured to the panel 18 and spaced therefrom.

As shown in Figures 2 and 3, the pinions 78 and 79 are disposed between the supporting strip 84 and the panel 18, with space provided for axial movement of the shaft 80. Normally the pinions are biased by a leaf spring 85 to a position such that they are out of engagement with the gears 76 and 77, and the pinion 78 engages the support strip 84 to limit movement of the shaft in one direction. When the shaft is moved axially against the biasing force of the leaf spring 85, a shoulder 86 thereon engages the surface of the panel 18 to limit the movement to a position in which the pinion 78 is drivingly engaged with the gear 76 and the pinion 79 is drivingly engaged with the gear 77.

A manually operable knob 87 is secured to the outer end of the shaft 80 for effecting both axial and rotational movement of the shaft. During rotational movements of the shaft 80, the cams are turned to their respective starting positions. In the disclosed timing apparatus I have provided a calibrated disc 88 on the shaft 38, which disc has indicia visible through an opening 89 in the cover. By observation of the indicia, the starting position for the cam 48 may be selected.

Since, in the present instance, a predetermined time interval is to be measured by the cam 45, the gear 76 has a portion 90 at which the teeth are removed to an extent such that when the pinion 78 reaches that portion, it will no longer turn the gear 76. The gear and pinion ratios are chosen so that a relatively small amount of movement of the gear 77 will require sufficient rotation of the shaft 80 and knob 87 to turn the gear 76 to its starting position determined by the portion 90.

In the disclosed system and apparatus, the timing switch 15, which embodies the cam 45 and the setting gear 76 for effecting the timing of a predetermined and relatively short period, is utilized for determining the time of the finish charge. The other switch 14, which is driven by the motor 43 and is adjustable through the action of the gear 77 to a position selected by observation of indicia on the calibrated disc 88, is utilized for determining an over-all or maximum charging period.

As shown in Figure 4, input leads 92 and 93 are adapted to connect to a power source through a connector plug 94. A line switch having blades 95 and 96 is connected in series with the input leads. A fuse 97 is preferably connected in series with one of the input leads and a voltmeter 98 is connected across the input leads to provide a designation of the line voltage. The input lead 92 is connected directly to a primary winding 99 of the transformer 12 when the line switch is closed.

The contacts 73, 75, 72 and 74 of the timing switches 14 and 15 are connected in series, and these series-connected switch contacts are connected in series with the input lead 93 between that input lead and an auxiliary primary winding 100 of the transformer 12. As an additional element in the circuit between the series-connected contacts of the timing switches and the primary winding of the transformer, an adjustable impedance 102 is provided. This impedance is normally short-circuited by contacts 103 and 104 of a relay having an actuating electromagnet 105. As is generally understood in the art, the auxiliary primary winding 100 is tapped and is provided so that compensation may be made for variations in line voltage and aging of the rectifier elements.

The motor 43, which operates the timing switches 14 for determining the over-all or maximum time period, has an operating winding 106 connected across the input leads through the series-connected timing contacts, so that after the initial setting of the timing switches, the motor 43 operates from the time the line switch is closed. An operating winding 107 of the motor 42, however, has one end connected directly to one of the input leads, while the other end is connected to the other input lead through normally open contacts 103 and 108 of the relay actuated by electromagnet 105. Thus, the operation of the timing switch 15 is dependent upon closing of the contacts 103 and 108 by energization of the electromagnet 105. When such energization of the electromagnet 105 occurs, the short circuit across the impedance 102 is broken to connect the impedance in series with the primary winding of the transformer, thereby reducing the input current to the transformer. In the disclosed system, energization of the electromagnet 105 is controlled by a voltage-responsive relay having an actuating electromagnet 109 and normally open contacts 110 and 112.

A secondary winding 113 of the transformer 12 has its ends connected to the rectifier elements 13 and is center-tapped so as to provide full wave rectification, the direct current therefrom being delivered to output leads 114 and 115. In the present instance, a connector plug 116 is provided on the output leads to facilitate the making of connections to a battery which is to be charged. An ammeter 117 is connected in series with the output lead 114, and a voltmeter 118 is connected across the output leads. Also, the actuating electromagnet 109 of the voltage responsive relay is connected across the output leads 114 and 115.

With the disclosed system and apparatus, the timing switches are set to their starting positions by pressing the knob 87 inwardly and turning it, while watching the indicia on the disc 88 through the opening 89. The operation of the single knob effects the setting of both timing switches. The main line switch may then be closed to start the charging cycle. This starts the operation of the timing switch 14 for determining the over-all or maximum period for charging the battery. If and when the battery voltage reaches a predetermined value during the charging cycle, the voltage-responsive relay will effect closure of the contacts 110 and 112, thereby energizing the electromagnet 105 with which the latter contacts are connected in series. The energization of the electromagnet 105 connects the impedance 102 in the primary circuit of the transformer to limit the charging rate, and also starts the timing switch 15. The opening of the contacts of either timing switch breaks the input circuit to the primary winding of the transformer, and thereby stops the operation of the system upon the expiration of either time period.

With this arrangement, the maximum charging period is limited to a preselected time. If, however, the battery approaches its fully charged condition in a time less than the maximum, the charging rate is reduced for providing a finish charge, and the duration of that finish charge is limited.

While I have described a preferred embodiment of my invention in detail, it will be understood that the description is intended to be illustrative rather than restrictive, as many details may be modified or changed without departing from the spirit or the scope of the invention. Accordingly, I do not desire it to be restricted to the exact structures described in so far as the broad generic aspect of the invention is concerned.

I claim:

1. A timing system comprising two separate cams having travel ranges corresponding to two different timing periods, electromagnetic means including windings for driving said cams, a pair of series-connected electric switches controlled by said cams, each cam having its own switch, said switches being closed for the duration of the respective cam controlled timing periods and being respectively opened at the termination of the respective cam controlled timing periods, manual means for setting one cam to one end of its travel range, manual means for setting the other cam at any desired position as a starting position and from which starting position said other cam is driven toward a switch opening position, the timing period for said one cam being shorter than the maximum timing period for the other cam, connections forming one series circuit through said two cam controlled switches and the winding of the electromagnetic means for driving said other cam, said one circuit having terminals for connection to a power circuit, additional connections forming a second series circuit including said two switches and winding of the electromagnetic means for driving said one cam, a third switch in said second circuit, said second circuit having terminals for connection to a power source, means responsive to a desired change in a physical condition for operating said third switch, two load circuits including said series-connected switches, connections between said load circuits and said third switch for selecting a load circuit to be controlled depending upon the condition of said third switch, whereby said other cam will determine an over-all control period independently of which load circuit is selected and, after said third switch has been operated, to change the load circuit selection and also cause said one cam to be driven, said one or other cam operated switch functioning to terminate the entire timer cycle either at the end of the over-all period or at the end of the shorter period, whichever comes first.

2. A timing system comprising two separate cams having travel ranges corresponding to two different timing periods, a pair of series-connected electric switches controlled by said cams, each cam having its own switch, said switches being closed for the duration of their respective cam controlled timing periods and being respectively opened at the termination of their respective cam controlled timing periods, a single manual control, means connecting said control and both cams for simultaneously moving said cams toward one end of their respective travel ranges, said connecting means providing a control ratio between said manual control and one cam whereby said one cam reaches its end of its travel range as a starting position when said other cam has only reached an intermediate point, said other cam having any desired starting position between said intermediate point and the end of its corresponding travel range, means for disabling the connecting means between said manual control and said one cam when said one cam has reached its starting position, said manual control being susceptible to further manipulation to move said other cam without disturbing said one cam setting, the timing period for said one cam being shorter than the timing period for the other cam, electromagnetic means including windings for driving said cams, connections forming one series circuit through said two cam controlled switches and the winding of the electromagnetic means for driving said other cam, said one series circuit having terminals for connection to a power circuit, additional connections forming a second series circuit through said two switches and winding of the electromagnetic means for driving said one cam, a third switch in said second circuit, said second circuit having terminals for connection to a power source, means responsive to a desired change in a physical condition for operating said third switch, and two load circuits including said series-connected switches, connections between said load circuits and said third switch for selecting a load circuit depending upon the condition of said third switch, whereby said other cam will determine an over-all control period irrespective of which load circuit is selected and upon the occurrence of a predetermined physical change during said over-all period said third switch will be operated, to change the load circuit and cause said one cam to be driven, said one or other cam-operated switch functioning to terminate the entire timer cycle either at the end of the over-all period or at the end of the shorter period, whichever comes first.

3. A timing system comprising two separate electric timing motors, a cam driven by each motor and having travel ranges corresponding to two different timing periods, a pair of series-connected electric switches controlled by said cams, each cam having its own switch, said switches being closed for the duration of their respective cam controlled timing periods and being respectively opened at the termination of their respective cam controlled timing periods, a single manual control, means connecting said control and both cams for simultaneously moving said cams toward one end of their respective travel ranges, said connecting means providing a control ratio between said manual control and one cam whereby said one cam reaches its end of its travel range as a starting position when said other cam has only reached an intermediate point, said other cam having any desired starting position between said intermediate point and the end of its corresponding travel range, means for disabling the connecting means between said manual control and said one cam when said one cam has reached its starting position, said manual control being susceptible to further manipulation to move said other cam without disturbing said one cam setting, the timing period for said one cam being shorter than the timing period for the other cam, energizing windings for said two timing motors, connections forming one series circuit through said two cam controlled switches and the winding of the other motor driving said other cam, said one series circuit having line terminals for connection to a power circuit, additional connections forming a second series circuit through said two switches and winding of said one motor driving said one cam, a third switch in said second circuit, said second circuit having line terminals for connection to a power source, means responsive to a desired change in a physical condition for closing said third switch, and two load circuits including said series-connected switches, connections between said load circuits and said third switch for selecting a load circuit depending upon the condition of said third switch, whereby said other cam will determine an over-all control period irrespective of which load circuit is selected and upon the occurrence of a predetermined physical change during said over-all period said third switch will be closed to energize the winding of the one motor and initiate a shorter timing period, and change the load circuit, said one or other cam-operated switch functioning to terminate the entire timer cycle either at the end of the over-all period or at the end of the shorter timing period determined by the one timing motor, whichever comes first.

4. The timing system according to claim 3 wherein said third switch forms part of a relay, said relay selecting which of the two load circuits is to be active.

5. A timing system comprising two separate electric timing motors, a cam for each motor, gearing and clutch means connecting each motor and the corresponding cam to drive the same, one motor driving one cam over one travel range corresponding to one timing period, the other motor driving the other cam over another travel range corresponding to another timing period, the other timing period being longer than the one timing period, a pair of series-connected electric switches controlled by said cam, each cam having its own switch, said switches being closed for the duration of their respective cam controlled timing periods and being respectively opened at the termination of their respective cam controlled timing periods, a single manual control, gears associated with said manual control and movable into engagement with the gear drive for said two cams for simultaneously moving said two cams toward one end of their respective travel ranges, the manually controlled gear for said one cam having a portion thereof free of gear teeth and the gear ratio being such that said one cam reaches its end of its travel range when said other cam has only reached an intermediate point of its travel range, said manual control being susceptible to further manipulation to move said other cam any desired amount after said one cam has been reset without disturbing said one cam, energizing windings for said two timing motors, connections forming one series circuit through said two cam controlled switches and the winding of the other motor, said one series circuits having terminals for connection to a power line, additional connections forming a second series circuit thorugh said two switches and winding of said one motor, a relay including switch contacts in said second circuit, said second circuit having terminals for connection to a power line, means responsive to a desired change in a physical condition for operating said relay to close said second circuit, two load circuits connected through said relay contacts so that one or other load circuit is active for control purposes depending upon the position of said relay, said load circuits including said series-connected switches whereby said other timing motor will determine an over-all control period irrespective of which load circuit is being controlled and after the occurrence of said predetermined physical change to operate said relay during said over-all period, said relay will be operated to energize said one motor and change the load circuit and drive the one cam, one or other cam operating to terminate a timer cycle either at the end of the over-all period or at the end of the smaller period initiated by said one timing motor, whichever is first.

6. In combination with a transformer and rectifier adapted to connection to a power source through input leads for charging a storage battery through output leads, a timing and control system comprising first and second time control switches adapted for setting to starting positions and each having contacts, said contacts being connected in series and being closed when the time control switches are set to starting positions, the first time control switch being adapted for setting to provide a predetermined maximum time period during which the contacts thereof are closed, the second time control switch being adapted for setting to provide a time period normally different than that of the first time control switch during which the contacts thereof are closed, said first time control switch having a timing element connected across the input leads so as to operate for the time power is to be applied to the transformer, a voltage responsive relay connected across the output leads to operate when the battery voltage reaches a predetermined value, said relay having contacts connected to effect actuation of a second relay, said second relay having contacts connected to a time control element of the second timing switch to effect operation of the second time control switch, said second relay also having contacts connected to means for reducing the input current to the transformer, and the series connected contacts of the time control switches being connected in series with said input leads so as to open the power circuit to the transformer when either time period expires.

7. In combination with electrical apparatus having input leads for connection to a power source and an output circuit for the delivery of electrical energy therefrom, a timing and control system comprising first and second time control switches, each having contacts connected in series with said input leads, said contacts being closed when the time control switches are set to starting positions to close the input leads from the power source to said apparatus, the first time control switch having time control means operative from the time of being set to a starting position and after said apparatus is connected to the power source for determining a selected maximum time period for operation of the apparatus, said second time control switch having time control means for determining a period less than said maximum, and means connected to the output circuit and responsive to a predetermined condition in the output circuit for starting the time control means of the second time control switch.

8. A combination as set forth in claim 7, the last mentioned means including means for effecting a change in the input current to said apparatus.

9. In combination with electrical apparatus having input and output circuits, two time control switches each having contacts connected in series with the input circuit, one of said time control switches being adjustable to determine a maximum period of operation of the apparatus, the other of the time control switches determining a predetermined lesser period, and means connected to the output circuit for starting said other of the time control switches.

10. A combination as set forth in claim 9, said means connected to the output circuit also including means for changing the impedance of the input circuit.

11. A combination as set forth in claim 9, said to time control switches having separate motivating elements and being provided with a setting mechanism including a single manually operable control knob for setting both said switches to starting positions by one operation of the control knob.

12. In battery charging apparatus, the combination comprising time control apparatus for determining two time periods, one of which overlaps the other, and means responsive to the condition of the battery being charged for determining the start of the period of shorter duration, said time control apparatus including two separately driven time switches, each having normally open contacts and a driven cam for holding the contacts together for a selected period, clutch means through which the cam is driven, a gear drivingly connected to each of the cams, and a manually operable control shaft having pinions thereon for engagement with the gears to set the cams to starting position, one of said time switches determining the maximum operating time of the apparatus, and said means responsive to the condition of the battery including means responsive to the voltage of the battery being charged for starting the second time switch.

13. Battery charging apparatus comprising a source of electrical energy, an input circuit to a storage battery, two pairs of electrical switch contacts connected in series between said source of electrical energy and said input circuit, means for initially closing said two pairs of switch contacts, a first time-control means associated with one of said pairs of switch contacts for opening said latter pair of switch contacts after a preselected time period, means associated with said first time-control device for varying said latter time period to adjust the maximum permissible changing period for the battery to be charged, a second time-control means associated with the other pair of switch contacts for initiating a second time period upon actuation thereof to open the other pair of switch contacts upon the termination of said second time period, condition-responsive means in said battery input circuit operable to actuate said second time-control means when the voltage in said battery input circuit exceeds a given predetermined value, and means responsive to the operation of said condition-responsive means to decrease the charging current fed to said input circuit when the voltage thereacross exceeds said latter predetermined value.

14. Battery charging apparatus comprising a first and second electric switch, first means for initially closing said first and second electric switches, first and second time-control means for determining respectively first and second time periods which normally overlap, second means coupled between said first time-control means and said first electric switch for opening said latter switch immediately upon termination of said first time period determined by said first control means, said first period determining the maximum possible charge time for the apparatus, third means coupled between said second time control means and said second electric switch for opening said latter switch immediately upon termination of said second time period determined by said second time control means, said second time period being a reduced finishing charge period for the apparatus, fourth means electrically connecting said electric switches in series circuit relation, a power input circuit electrically connected to one side of said series connected switches, a power output circuit electrically coupled to the other side of said series connected switches and adapted to be coupled to the input of a storage battery whereby power may be interrupted in said power output circuit upon the opening of either switch, first energization means associated with said first time control means adapted to operate said first time-control means to initiate said first time period as the apparatus is initially placed in operation, second energization means associated with said second time control means adapted to operate said second time-control means, battery charge condition-responsive means in said power output circuit responsive to a condition in said output circuit indicating the need for a reduced charging rate by energizing said second energization means to cause the said second time-control means to initiate said second time-control period, and means responsive to said battery charge condition-responsive means to reduce the amount of power fed to said power output circuit during said second time period.

15. Battery charging apparatus comprising a first and second electric switch connected in series, a power input circuit, a power output circuit, a first and second time-control means for determining respectively first and second time periods where the first time period is variable for determining a maximum possible charging time for the apparatus and includes time periods much longer than said second time period, said second time period being normally fixed for determining a reduced finishing charge period for the apparatus, each of said time-control means including movable control elements for maintaining said electric switches in a closed condition only during said respective first and second time periods, and which are put in motion at the time for initiation of said respective first and second time periods, means for energizing said first time-control means to start the associated movable control element in motion when the battery charging apparatus is first put into operation, means for energizing said second time-control means to start the associated movable control element in motion when the condition exists for a reduced finishing charging rate, means coupling the said power input circuit to one side of said series-connected switches, means coupling the power output circuit to the other side of said series-connected switches, means responsive to said condition requiring a reduced battery charge to reduce the amount of charging current fed to said power output circuit during said second time period, said time-control means adapted so that the initial position of said movable elements determines the time of termination of said respective first and second time periods, the movable control element associated with said second time-control means having a fixed initial position whereby said second time period may be fixed, a single control means for simultaneously positioning the said movable elements to their initial position after prior operation of the apparatus and including a movable control knob and respective coupling members mechanically coupling the motion of said control knob respectively to the movable control elements of said first and second time control means, said coupling members adapted to move the said movable control element of said second time-control means to its fixed initial position after only a small movement of said control knob relative to the total amount of movement of the control knob necessary to adjust the position of the movable control element of said first time-control means to an initial position for determining a normal first time period, the coupling between the control knob and the movable element of said second time-control means including a lost-motion element to allow said latter movable element to remain in its fixed initial position while the control knob is being operated to adjust said first time-control means.

16. Battery charging apparatus comprising first means for determining a maximum over-all charging period for the battery to be charged, including a first pair of normally closed switch contacts and a first time-control means for opening said switch contacts after a maximum over-all charging period has elapsed, second means for determining a reduced finishing charge period for a battery to be charged when the charge condition of the battery so requires, said second means including a second pair of normally closed switch contacts electrically connected in series with said first pair of switch contacts and a second time-control means for opening said second pair of switch contacts after the period for reduced charging has elapsed, a power input circuit coupled to one side of said series-connected switch contacts, a power output circuit adapted to be coupled to a storage battery coupled to the other side of said series-connected switch contacts, whereby termination of either the maximum over-all charging period or the period for reduced charging will disconnect power from said power output circuit.

17. The combination of claim 16 wherein said first and second time-control means include means for energizing same to make same operative to time the period during which the associated switch contacts remain closed, means for connecting said energizing means to a source of energizing voltage through the normally closed series-connected switch contacts whereby the entire apparatus becomes quiescent upon termination of either the over-all charging period or the reduced finishing charge period.

18. Battery charging apparatus comprising first means for determining a maximum over-all charging period for the battery to be charged, including a first pair of switch contacts and a first time-control means for maintaining said contacts in a closed condition until the termination of said maximum over-all charging period, second means for determining a reduced finishing charge period for a battery to be charged when the charge condition of the battery so requires, said second means including a second pair of switch contacts electrically connected in series with said first pair of switch contacts and a second time-control means for maintaining said second pair of switch contacts closed until the termination of said reduced finishing charge period, a power input circuit coupled to one side of said series-connected switch contacts, a power output circuit adapted to be coupled to a storage battery coupled to the other side of said series-connected switch contacts whereby termination of either the maximum over-all charging period or the period for reduced charging will disconnect power from said power output circuit.

19. The combination of claim 18 wherein said first and second time-control means include means for energizing same to make same operative to time the period during which the associated switch contacts remain closed, means for connecting said energizing means to a source of energizing voltage through the normally closed series-connected switch contacts, whereby the entire apparatus becomes quiescent upon termination of either the over-all charging period or the reduced finishing charge period.

20. In combination, a first and second electric switch, first means for initially closing said first and second electric switches, first and second time-control means for determining respectively first and second time periods which normally overlap, second means coupled between said first time-control means and said first electric switch for opening said latter switch immediately upon termination of said first time period determined by said first control means, third means coupled between said second time-control means and said second electric switch for opening said latter switch immediately upon termination of said second time period determined by said second time-control means, fourth means electrically connecting said electric switches in series circuit relation, a power input circuit electrically connected to one side of said series-connected switches, a power output circuit electrically connected to the other side of said series-connected switches whereby power is interrupted to said power output circuit upon the opening of either switch, first energization means associated with said first time-control means adapted to operate said first time-control means to initiate said first time period, and second energization means associated with said second time-control means adapted to operate said second time-control means to initiate said second time period at a different time than the beginning of said first time period.

21. In combination, a first and second electric switch, a first and second time-control means for determining respectively first and second time periods where the first time period is variable and includes time periods much longer than said second time period, said second time period being normally fixed, each of said time-control means including movable control elements for maintaining said electric switches in a closed condition only during said respective first and second time periods and which are put in motion at the time for initiation of said respective first and second time periods, the initial position of said movable elements determining the time of termination of said respective first and second time periods, the movable control element associated with said second time-control means having a fixed initial position whereby said second time period may be fixed, a single control means for simultaneously positioning the said movable elements to their initial position after prior operation of the timer including a movable control knob and respective coupling members mechanically coupling the motion of said control knob respectively to the movable control elements of said first and second time-control means, said coupling members being adapted to move the said movable control element of said second time-control means to its fixed initial position after a small movement of said control knob relative to the total amount of movement of the control knob necessary to adjust the position of the movable control element of said first time-control means to an initial position for determining a normal first time period, and the coupling between the control knob and the movable element of said second time-control means including a lost-motion element to allow said latter movable element to remain in its fixed initial position while the control knob is being operated to adjust said first time-control means.

References Cited in the file of this patent

UNITED STATES PATENTS

| Number | Name | Date |
|---|---|---|
| 1,430,107 | Ogden | Sept. 26, 1922 |
| 1,786,280 | Woodbridge | Dec. 23, 1930 |
| 1,851,592 | Paschen et al. | Mar. 29, 1932 |
| 2,103,907 | Kearsley | Dec. 28, 1937 |
| 2,224,593 | Brown et al. | Dec. 10, 1940 |
| 2,227,118 | Amsden | Dec. 31, 1940 |
| 2,295,993 | Gruettner | Sept. 15, 1942 |
| 2,307,315 | Wolfe | Jan. 5, 1943 |
| 2,346,694 | Maris | Apr. 18, 1944 |
| 2,427,207 | Grierson | Sept. 9, 1947 |
| 2,433,254 | Aiken | Dec. 23, 1947 |
| 2,456,978 | Medlar | Dec. 21, 1948 |
| 2,635,689 | Hall | Apr. 21, 1953 |

FOREIGN PATENTS

| Number | Country | Date |
|---|---|---|
| 580,546 | Great Britain | Sept. 11, 1946 |